United States Patent

[11] 3,610,831

[72] Inventor Stephen L. Moshier
Cambridge, Mass.
[21] Appl. No. 827,777
[22] Filed May 26, 1969
[45] Patented Oct. 5, 1971
[73] Assignee Listening Incorporated
Arlington, Mass.

[54] SPEECH RECOGNITION APPARATUS
13 Claims, 2 Drawing Figs.

[52] U.S. Cl. .......... 179/1 SA
[51] Int. Cl. .......... G10l 1/00
[50] Field of Search .......... 179/1 AS, 1 SB; 324/77 H

[56] References Cited

UNITED STATES PATENTS

| | | | |
|---|---|---|---|
| 3,069,507 | 12/1962 | David .......... | 179/15.55 |
| 2,977,543 | 3/1961 | Lutz et al. .......... | 328/110 |
| 2,996,579 | 8/1961 | Slaymaker .......... | 179/1 |
| 3,026,475 | 3/1962 | Applebaum .......... | 324/77 |

*Primary Examiner*—Kathleen H. Claffy
*Assistant Examiner*—Horst F. Brauner
*Attorney*—Kenway, Jenney & Hildreth

ABSTRACT: The apparatus disclosed herein identifies different vocal sounds by applying a voice signal which is to be analyzed to a tapped delay line and then linearly summing or mixing preselected proportions of the differently delayed signals. The contribution from each tap is weighted as a function of a corresponding characteristic of a respective vocal sound in such a way that the composite signal obtained by mixing has a minimum average amplitude when there is a correspondence between the input voice signal and the respective vocal sound.

INVENTOR
STEPHEN L. MOSHIER
BY
Kenway, Jenney & Hildreth
ATTORNEYS

| Phoneme | Delay, milliseconds 0.0 | 0.1 | 0.2 | 0.3 | 0.4 | 0.5 | 0.6 | 0.7 | 0.8 | 0.9 | Channel |
|---|---|---|---|---|---|---|---|---|---|---|---|
| ee (meet) | +1 | -1.67 | +1.09 | -1.67 | -.46 | 0 | 0 | +.62 | +1.14 | 0 | A |
| a (father) | +1 | -1.70 | +.53 | 0 | +.84 | 0 | 0 | 0 | 0 | 0 | B |
| r (run) | +1 | -1.61 | -.78 | +1.05 | -.62 | +.34 | 0 | 0 | +.90 | 0 | C |
| e (set) | +1 | -1.92 | +.84 | 0 | 0 | 0 | +.47 | 0 | 0 | 0 | D |
| n (none) | +1 | -1.89 | +.74 | -.78 | +.37 | 0 | 0 | +1.05 | -.78 | 0 | E |
| m (man) | +1 | -1.67 | +.62 | 0 | 0 | 0 | 0 | 0 | 0 | +.62 | F |
| i (sit) | +1 | -1.70 | +.37 | -.56 | 0 | 0 | +.90 | 0 | 0 | +.37 | G |
| u (butter) | +1 | -1.61 | 0 | 0 | +.62 | 0 | 0 | 0 | 0 | +.47 | H |
| l (let) | +1 | -1.67 | +.62 | 0 | 0 | 0 | 0 | +.74 | 0 | 0 | I |
| o (boat) | +1 | -1.77 | -.65 | 0 | +.24 | +.37 | 0 | 0 | 0 | 0 | J |
| oo (boot) | +1 | -1.89 | 0 | -.71 | 0 | 0 | 0 | 0 | 0 | 0 | K |
| f (fry) | +1 | -1.00 | +1.18 | 0 | +.34 | 0 | 0 | 0 | 0 | 0 | L |
| z (buzz) | +1 | -1.30 | 0 | +1.11 | 0 | 0 | 0 | +.71 | 0 | 0 | M |
| s (see) | +1 | -.62 | -.96 | 0 | 0 | 0 | 0 | +.65 | 0 | 0 | N |

FIG. 2

INVENTOR
STEPHEN L. MOSHIER
BY Kenway, Jenney & Hildreth
ATTORNEYS

SPEECH RECOGNITION APPARATUS

Background of the Invention

This invention relates to speech recognition apparatus and more particularly to such apparatus which will identify a plurality of preselected vocal sounds.

Various proposals have been made heretofore for providing apparatus which will recognize human speech or which identify personnel by means of their unique voice characteristics. These latter have sometimes been referred to as voice prints. Among the approaches which have been suggested for such devices are spectrum analysis, including the use of a Fourier transform, and auto- or cross-correlation techniques. Various devices constructed in accordance with these principles, however, have met with only limited success. It is at present believed that this lack of success is to some extent due to the amplitude averaging which occurs at an early point in these prior art processes and which is believed to cause a loss of phase information.

According to one aspect of the present invention, the human vocal system is considered to be an imperfect information transmitting channel which is driven by a white noise or impulse input signal. The vocal chord impulses and the motion of air during unvoiced speech are ready-made impulse and white noise test signals for driving the vocal tract according to this understanding. The vocal tract operates to produce time spreading, by means of internal reflections in the vocal tract, which give each voice its characteristic sound or timbre. In In other words, the effect of the vocal tract is to store energy from the energizing signal and to add it back at later times with a resultant increase in average power output as compared with the case if the walls of the vocal tract were nonreflective.

According to a further aspect of the invention, the imperfect channel, i.e. the vocal tract in a particular speech configuration, is analyzed by matching the imperfect channel with a delay line filter which matches or complements the channel being analyzed so as to minimize or reconstruct the original white noise input signal.

Among the several objects of the present invention may be noted the provision of apparatus which will identify vocal sounds; the provision of such apparatus which will recognize phonemes; the provision of such apparatus which will identify a speaker by means of his voice characteristics; the provision of such apparatus which will operate in real time; the provision of such apparatus which is accurate; and the provision of such apparatus which is relatively simple and inexpensive. Other objects and features will be in part apparent and in part pointed out hereinafter.

SUMMARY OF THE INVENTION

Briefly, apparatus according to this invention will determine whether a given input signal corresponds to a preselected vocal sound. The apparatus employs delay means providing a plurality of differently delayed signals from the given signal. Respective preselected proportions of each of the delayed signals are mixed thereby to obtain a composite signal with the contribution from each delayed signal being weighted as a function of a corresponding characteristic of the preselected vocal sound. The apparatus also includes means for generating an output signal when the average amplitude of the composite signal crosses a selected threshold thereby to indicate that the input signal corresponds to the preselected vocal sound.

BRIEF DESCRIPTION OF THE DRAWINGS

FIG. 2, is a table of attenuation coefficients which may be set into the apparatus of FIG. 1 to enable it to recognize a plurality of preselected phonemes.

Corresponding reference characters indicate corresponding parts throughout the several views of the drawings.

DESCRIPTION OF THE PREFERRED EMBODIMENT

Figure 1:
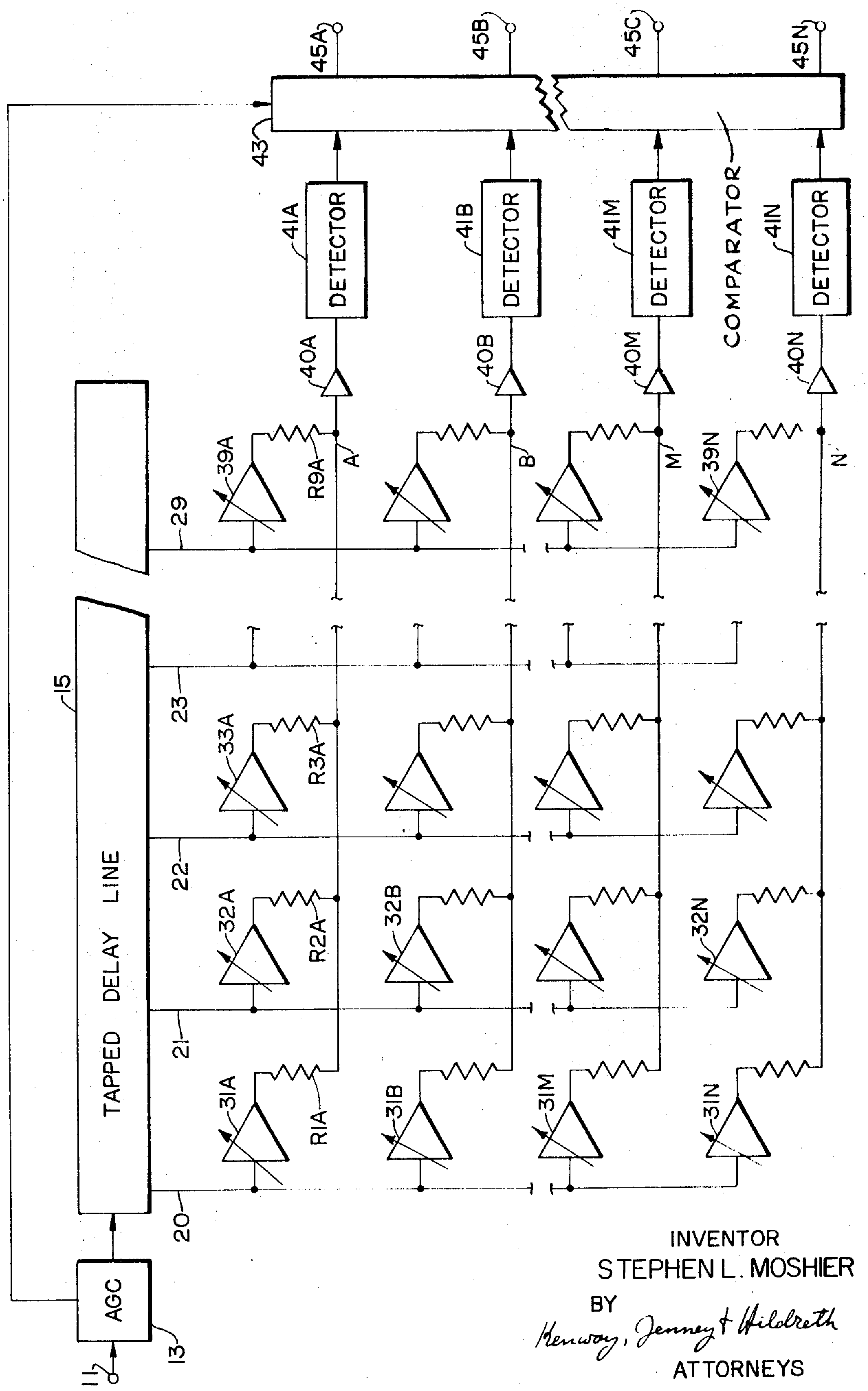
FIG. 1, is a block diagram of a phoneme recognition system according to this invention.

Referring now to FIG. 1, the apparatus illustrated there is adapted to distinguish or recognize various vocal sounds which may be contained in a or represented by a voice input signal applied to an input terminal 11. Such an input signal may, for example, be obtained directly from a microphone into which a person is speaking or from a recording made prior to the analysis performed by the present apparatus. The given voice signal is applied to an a.g.c. (automatic gain control) amplifier 13 so as to obtain a voice signal having a substantially constant or preselected amplitude. To keep the output signal from a.g.c. amplifier 13 at as constant a level as possible, the response time of the a.g.c. loop is preferably only somewhat slower than the lowest frequency voice component of significance.

The constant amplitude voice signal provided by the a.g.c. amplifier 13 is applied to a tapped delay line 15. While delay line 15 is conveniently described as being tapped, it should be understood that any delay means which will provide a variety of differently delayed signals from a given input signal may be employed. Thus, delay line 15 may, in fact, comprise a plurality of delaying elements connected in series or in parallel and may include either continuous delaying media, e.g. coaxial or acoustic delay lines, or delay lines comprising discreet components, e.g. inductors and capacitors. For the purpose of illustration, the apparatus of FIG. 1 may be assumed to be a phoneme recognizer, that is, a device which will recognize a plurality of sounds characteristic of human speech when spoken by different subjects. For such a purpose, delay line 15 may conveniently be constructed to provide a total delay of 0.9 milliseconds with the increment of delay between successive taps being 0.1 milliseconds. The output leads or taps from delay line 15 are designated 20 through 29 and provide delays ranging successively from no delay (0.0) to the maximum of 0.9 milliseconds delay.

For each phoneme which is to be recognized, the apparatus of FIG. 1 generates a composite signal by mixing preselected proportions of the differently delayed signals obtained from the taps 20–29. The phoneme recognizer illustrated is assumed to be arranged to recognize fourteen different phoneme and the respective composite signals are provided at respective leads A–N. In order to conserve space in the drawing, the intermediate delay line taps and the intermediate composite signal leads, together with their associated components, have been omitted. It will, however, be understood that these omitted components are essentially similar to those actually illustrated and thus complete a ten by fourteen matrix as will be apparent to those skilled in the art.

Taking the first composite signal lead A as an example, a respective preselected proportion of each of the differently delayed signals is obtained by means of a respective adjustable 7 amplifier 31A–39A and is applied to the lead A through a respective mixing or isolating resistor R1A–R9A. The adjustable amplifiers are adapted to provide a gain which can range between + 2 and − 2 so that the strength or weighting of each signal contribution can be adjusted to any desired level and can be reversed in polarity or phase. Thus, the contribution from each delay line tap can be preselected, substantially at will. Composite signals for each of the different phonemes to be recognized are generated in essentially similar fashion, the respective adjustable amplifiers and mixing resistors being designated in corresponding fashion to relate each to the tap and composite signal line with which it is associated.

Each composite signal lead A N is applied, by means of a respective unity-gain mixing or buffer amplifier 40A–40N, to a respective detector circuit 41A–41N. Each detector operates to generate a respective voltage signal which is substantially proportional to the average amplitude of the composite signal applied to that detector. The signals from the detector circuits are in turn applied to a comparator circuit 43. Comparator circuit 43 operates to determine which of the various voltage levels applied thereto is the lowest and provides, at a respective lead 45A–45N, a signal indicating that the respective composite signal has the lowest average amplitude of the several composite signals. The signal provided by the comparator at a respective one of the leads 45A–45N may conveniently be in the form of a binary logic signal suitable for driving digital logic or computer circuitry. As will be understood by those skilled in the art, such circuitry or logical analysis equipment may be used with the illustrated apparatus to provide further information regarding the original voice input signal. It should be understood that digital circuitry, e.g. a computer with appropriate peripheral or interface equipment, may also be used to provide the delay, mixing and detection operations just described, by using simulation techniques understood by those skilled in the art rather than the analog elements described by way of example. Thus, the claims should be understood to cover such equivalents.

As typical voice signals will include lapses or periods of no significant signal amplitude during which it would not be appropriate to select between the different possible phonemes, the a.g.c. signal from amplifier 13 is also applied to the comparator 43 as a gating signal to prevent the generation of any output signal at all when the level of the voice input signal falls below a preselected level.

In practice, the gain of each of the individual amplifiers 31A–39N is adjusted in accordance with a corresponding characteristic of the respective vocal sound or phoneme, the adjustment in each case being made to cancel or nullify a corresponding component in the vocal sound. As was noted previously, such a component may be caused originally be a delaying reflection in the vocal system of the speaker as he speaks the particular phoneme. In actual practice, the amplifiers may be conveniently adjusted empirically by employing a tape loop recording of each phoneme to drive the apparatus while the gains of the respective set of amplifiers are adjusted to minimize the average amplitude of the respective composite signal, each set of amplifiers corresponding to a given phoneme being adjusted in turn in this fashion. FIG. 2 is a table showing the coefficients determined in this matter for a delay line, such as that illustrated, having ten taps providing delays ranging incrementally from 0.0 to 0.9 milliseconds. In this table, the phoneme corresponding to each set of mixing network coefficients is indicated in conventional fashion, together with a word including the phoneme. The desired amplifier gains may also be computed numerically be use of a least-squares error minimization program.

While there are, of course, differences between individuals in the pronunciation of these various phonemes, it has been found that the number of taps, i.e. the resolution of the system, may be selected to provide relatively consistent recognition of phonemes despite individual speaker variations. It is believed that this is possible because there is relatively little variation in the size of the larynx and vocal tract among adult humans. Accordingly, the delays which determine the characteristics of a given phoneme are relatively consistent from person to person. With a ten tap delay line such as that illustrated, phonemes were recognized with about 90 percent accuracy using as input signals the voices of the same group of six individuals whose voices were used in calibrating the apparatus, i.e. those individuals whose voices were used in setting the mixing or weighting coefficients set forth in the table of FIG. 2.

As the system illustrated applies amplitude averaging or detection only after the different signal components have been summed or mixed, it can be seen that this apparatus functions in so-called real time. In other words, the system can analyze the phoneme content of a speaker's voice as he speaks. As will be understood, such a system is thus highly useful in the development of automatic speech recognition and analysis equipment.

While it has been found that analysis of a voice signal may be most readily accomplished by cancelling or nullifying the various components present in the different phonemes and then seeking a minimum amplitude signal, analysis can also be done by reenforcing the various characteristic components and then seeking a maximum average amplitude.

While phoneme recognition may be accomplished for a range of individuals using a delay line filter providing relatively coarse resolution, e.g. one having ten taps spanning a total delay of one millisecond as illustrated, a higher resolution delay line filter, i.e. one having more taps, may be employed to determine whether it is a particular individual who is speaking a preselected sound. Thus, by adjusting tap coefficients in a relatively high resolution delay line filter to match a given person speaking a preselected sound or phoneme, apparatus according to the present invention may subsequently be used to identify that person. As is apparent, the reliability of such an identification procedure can be substantially increased by using, as identifying criteria, a number of phonemes which the subject must speak in sequence. A useful example of such an application of this invention is in credit card verification where a person presenting a credit card may be asked to speak the credit card number. By using apparatus according to this invention, a verifying agency can then determine whether the individual speaking is, in fact, the person authorized to use the card. Depending upon the particular application and the accuracy required, the resolution of the system, i.e. the number of taps used, may be selected appropriately. As will be understood by those skilled in the art, increasing the resolution of the filter will produce an increasing rejection rate, i.e. an indication of lack of correspondence, due to nominal variations in a given speaker's voice. Thus, a balance between reliability and false rejection must be achieved depending upon the particular use to which the system is being put. In an extreme case, the system would respond only to an exact recording of the sound for which the filter mixing network were calibrated.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

I claim: Apparatus for determining whether a given analog signal corresponds to a preselected vocal sound, said apparatus comprising:

delay means providing a plurality of differently delayed signals from said given signal;

a corresponding plurality of means for respectively weighting said differently delayed signals;

means for linearly mixing the weighted signals thereby to obtain a composite signal, the contribution from each delayed signal being weighted as a respective function of a corresponding characteristic of the preselected vocal sound; and means for generating an output signal when the average amplitude of said composite signal crosses a selected threshold thereby to indicate that the given signal corresponds to said preselected vocal sound.

2. Apparatus as set forth in claim 1 further comprising an a.g.c. amplifier for bringing said given signal to a substantially predetermined average amplitude prior to application to said delay means.

3. Apparatus as set forth in claim 2 wherein said delay means provides in the order of ten differently delayed signals from said given signal.

4. Apparatus as set forth in claim 3 wherein the delays provided by said delay means differ over a range of about one millisecond.

5. Apparatus as set forth in claim 4 wherein said output signal generating means include a detector circuit to which said composite signal is applied.

6. Apparatus as set forth in claim 1 wherein each of said weighting means includes means for selectively reversing the phase of the respective delayed signal contribution to the composite signal.

7. Apparatus for determining whether a given analog signal corresponds to a preselected vocal sound, said apparatus comprising:

means for compensating proportionally for variations in the average amplitude of said given signal from a substantially predetermined average amplitude;

delay means providing a plurality of differently delayed signals from said signal of predetermined amplitude;

a corresponding plurality of means for respectively weighting said differently delayed signals in selected phase polarity; means for linearly mixing said delayed and weighted signals thereby to obtain a composite signal, the contribution from each delayed signal being weighted as a respective function of a corresponding characteristic of the preselected vocal sound; and means for generating an output signal when the average amplitude of said composite signal crosses a selected threshold thereby to indicate that the given signal corresponds to said preselected vocal sound.

8. Apparatus for identifying which of a plurality of preselected vocal sounds is represented by a given analog signal, said apparatus comprising:

delay means providing a plurality of differently delayed signals corresponding to said given signal;

for each of said preselected vocal sounds, a respective plurality of means for respectively weighting said differently delayed signals;

for each of said preselected vocal sounds, a respective means for linearly mixing the respective set of delayed and weighted signals thereby to obtain a respective function composite signal, the contribution from each delayed signal being weighted as a respective function of a corresponding characteristic of the respective vocal sound; and means for indicating which of said composite signals has an average amplitude which is in a preselected relationship to the average amplitudes of the other composite signals thereby to identify which of the corresponding vocal sounds is best represented by said given signal.

9. Apparatus as set forth in claim 8 wherein each of said weighting means includes means for selectively reversing the phase of the signal contribution to the respective composite signals.

10. Apparatus as set forth in claim 8 wherein said apparatus includes an a.g.c. amplifier for bringing an input signal of varying amplitude to a predetermined average amplitude.

11. Apparatus as set forth in claim 8 wherein said comparator circuit provides a signal indicating which of said composite signals has the smallest average amplitude.

12. Apparatus for identifying which of a plurality of preselected vocal sounds corresponds most closely to a given analog voice signal, said apparatus comprising:

a delay line having a plurality of taps providing different delays;

means for applying said given analog voice signal to said delay line;

for each of said vocal sounds, a respective means for respectively weighting said differently delayed signals;

for each of said vocal sounds, a respective mixing network for linearly summing the respective set of delayed and weighted signal components taken from said different taps thereby to obtain a respective composite signal, each network including means for weighting the contribution from each tap as a respective function of a corresponding characteristic of the respective vocal sound;

a detector circuit for each mixing network providing a signal voltage which varies as a function of the average amplitude of the respective composite signal; and a comparator circuit responsive to said signal voltages for providing a signal indicating which of said composite signals has the smallest amplitude thereby to indicate that the respective vocal sound is the one which corresponds most closely to said given voice signal.

13. Apparatus as set forth in claim 12 including means for inhibiting the operation of said comparator circuit when the amplitude of said given signal falls below a preselected level.